May 2, 1939.  H. W. PRICE  2,156,305

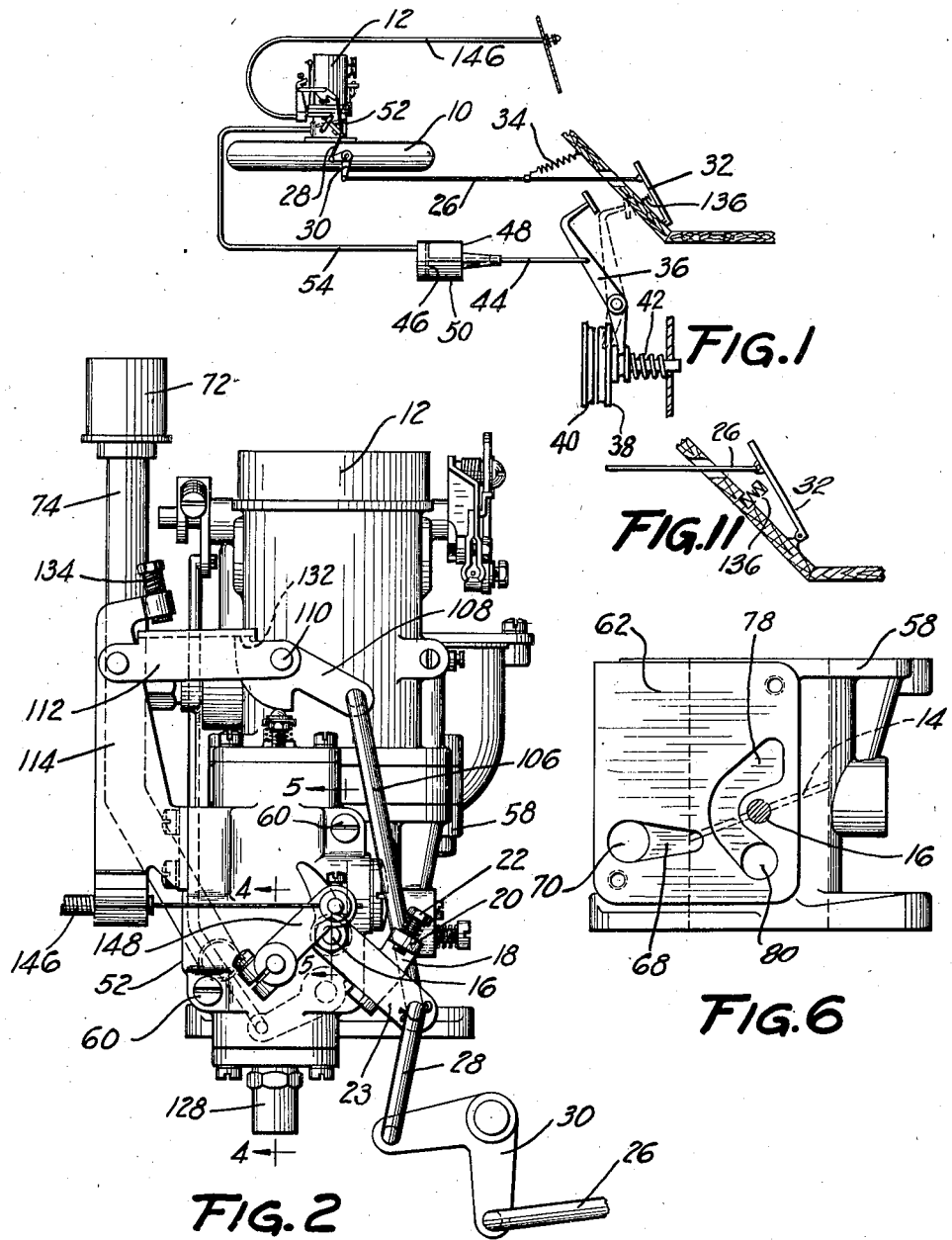

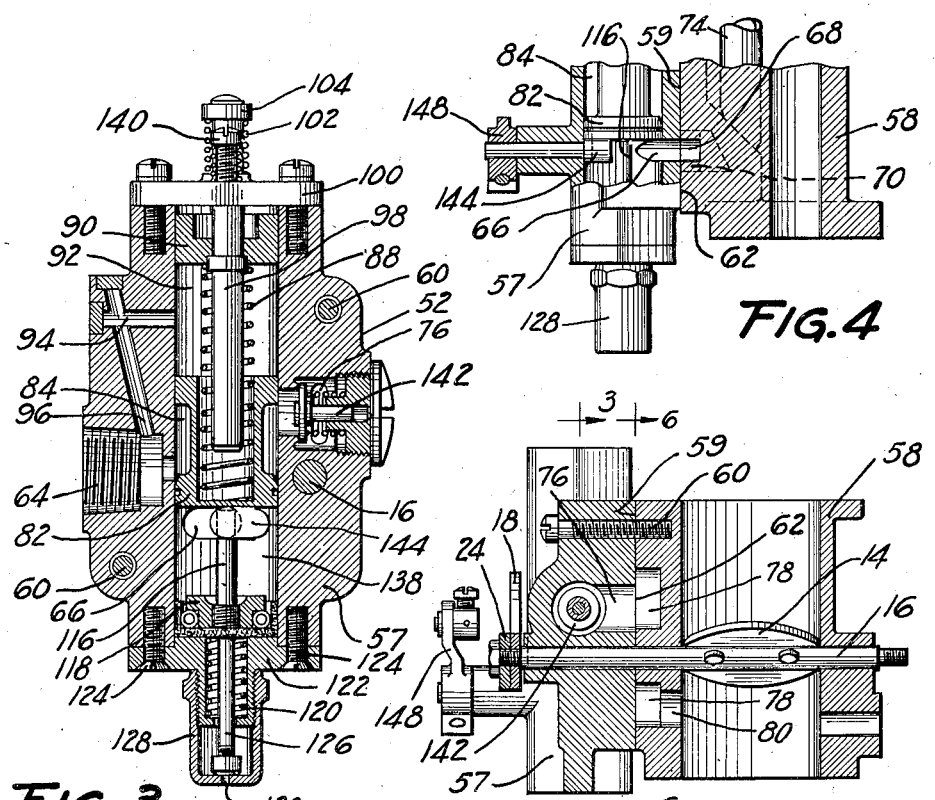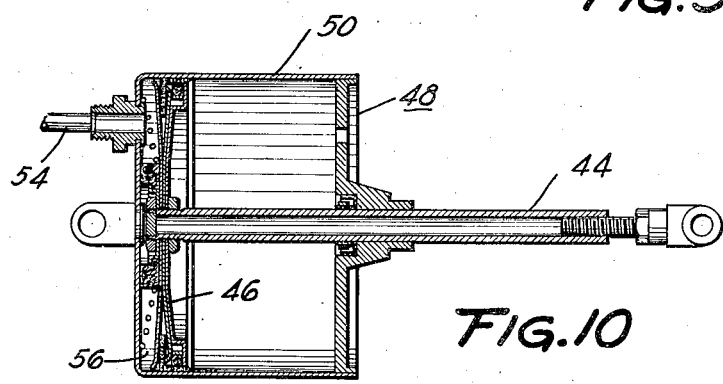

CLUTCH CONTROL MECHANISM

Filed Oct. 12, 1934  3 Sheets-Sheet 3

INVENTOR.
HAROLD W. PRICE
BY H. O. Clayton
ATTORNEY

Patented May 2, 1939

2,156,305

UNITED STATES PATENT OFFICE 2,156,305

CLUTCH CONTROL MECHANISM

Harold W. Price, South Bend, Ind., assignor to Bendix Products Corporation, South Bend, Ind., a corporation of Indiana Application October 12, 1934, Serial No. 748,097

11 Claims. (Cl. 192—.01)

This invention relates to automotive clutch control mechanism, and more particularly to an accelerator controlled power mechanism for operating the clutch in such fashion as to closely simulate a skillful manual operation thereof.

Heretofore in the development of this art the mechanism was designed to automatically disengage the clutch upon release of the accelerator and upon depression of the accelerator to initiate a two-stage engagement of the clutch, the rate of clutch movement during the second stage depending upon the position of the accelerator. However, such mechanism, in a measure, proves unsatisfactory, inasmuch as the engagement of the clutch is automatically completed with each and every throttle-open position of the accelerator, no means being provided for a so-called maneuvering control of the clutch in coordination with the opening of the throttle. This latter operation of the throttle and clutch is that which is effected in a conventional operation of an automotive vehicle. The accelerator is depressed by the right foot of the driver, as the clutch pedal is released by the left foot, and in such fashion as either to move the vehicle forward or to back it up in accordance with torque requirements; that is, smoothly and with the least wear and tear on both the engine and the clutch.

The invention is accordingly directed to a clutch operating power mechanism wherein the clutch engagement control, that is the control of the clutch plate loading pressures, is so correlated with the degree of throttle opening as to closely simulate a conventional manual operation of the throttle and clutch. To this end there is provided a clutch operating pressure differential actuated motor, the control valve thereof being of the pressure balanced follow-up type and operated by the accelerator. For a given position of the accelerator there is thus effected a corresponding position of the clutch, controlling both the engagement and the disengagement thereof.

A further object of the invention is to provide means for so controlling the aforementioned power means as to temporarily limit the clutch plate loading pressure to a predetermined maximum, thus obviating any undesirable jerking of the vehicle as the clutch is moved into engagement.

Yet another object of the invention is to provide automatically operable means, supplementing the accelerator and the aforementioned pressure limiting means, for operating the aforementioned pressure balanced valve to control the engagement of the clutch.

A further object of the invention is to incorporate a check valve in the connection between the source of power, preferably the intake manifold, and the differential pressure motor, thus providing an additional means for limiting clutch plate pressure to a predetermined maximum.

Yet another object of the invention is to provide power means, controlled in part by the accelerator, operative to permit the clutch to move relatively rapidly, under the action of the clutch springs, up to the cushioning point in the engagement of the clutch and to thereafter move either continuously or intermittently, depending upon the mode of operation of the accelerator.

A further object of the invention is to provide a valve mechanism operative for accomplishing the desired results referred to and wherein the mechanism is extremely simple in construction and economical to manufacture in view of the relatively few parts and few adjustments of those parts.

Lastly, the invention contemplates a compact valve mechanism readily adapted for either mounting upon or constituting an integral part of the carburetor, thus among other things obviating the use of tubing necessary to interconnect the valve mechanism and source of vacuum and also simplify the linkage interconnecting the throttle and valve.

Other objects of the invention and desirable details of construction and combinations of parts will become apparent from a detailed description of certain embodiments of the invention, described in detail in the following specification, taken in conjunction with the accompanying drawings illustrating said embodiments, in which:

Figure 1 is a diagrammatic view of the preferred form of clutch control mechanism constituting my invention;

Figure 2 is an enlarged side elevational view of the combined carburetor and clutch control valve unit;

Figure 3 is a transverse sectional view, taken generally along the line 3—3 of Figure 5, disclosing the most important details of the valve mechanism, the parts being in the closed throttle and clutch disengaged position;

Figure 7:
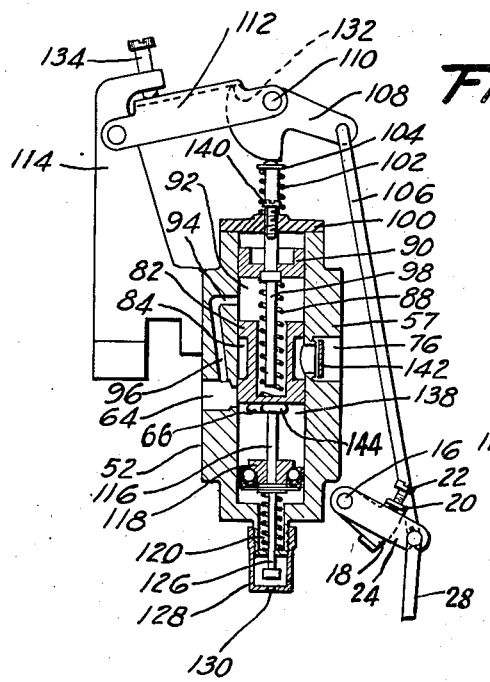
Figure 8:
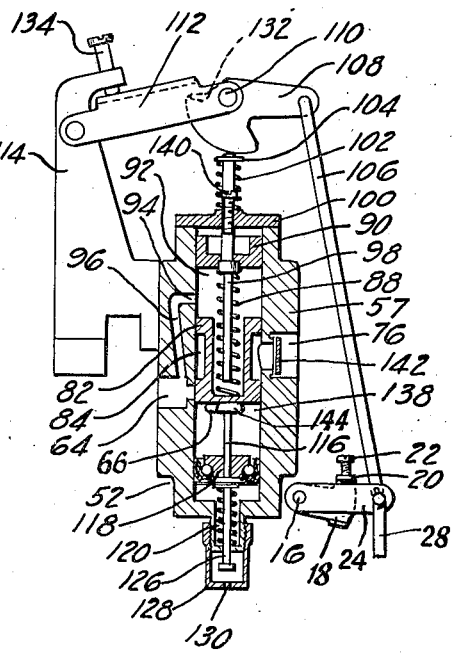
Figure 9:
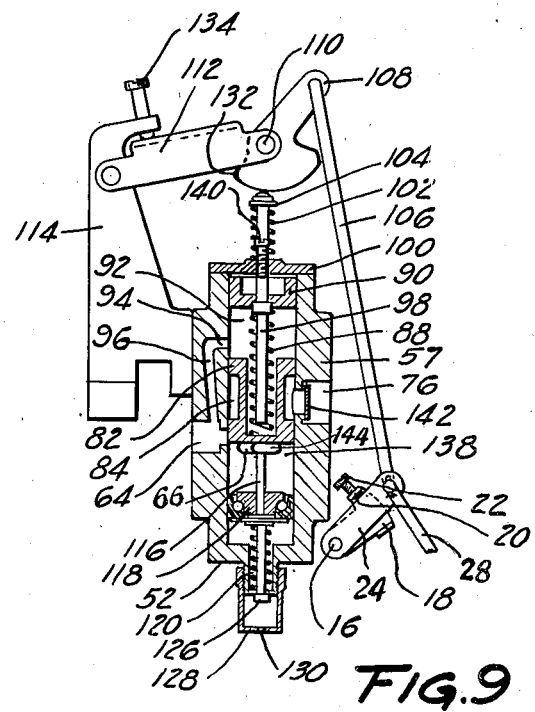

Figures 4, 5 and 6 are sectional views, taken respectively on the lines 4—4, 5—5 and 6—6 of Figures 2 and 5, disclosing details of the valve and carburetor unit;

Figures 7, 8 and 9 disclose respectively the hereinafter described clutch-cushioning, quarter-throttle and full-throttle positions of the valve and valve operating linkage, the parts being shown somewhat diagrammatically;

Figure 10 is a longitudinal sectional view of the fluid pressure motor for operating the clutch; and Figure 11 is an enlarged view of the stop member associated with the foot control member.

Referring to Figure 1, the numeral 10 designates the intake manifold of a motor vehicle engine to which is connected a carburetor 12, shown in the present instance as being of the down-draft type. The carburetor is provided with the usual throttle 14 mounted on a shaft 16, and a crank arm or pick-up lever 18 is connected to this shaft to operate the throttle. The arm 18 is provided with a boss 20, threadedly receiving an adjustable stop 22, the latter adapted to be contacted by a floating crank 24, loosely mounted on the shaft 16. The crank 24 is connected with an accelerator rod 26 by a link 28 and bell crank 30. The crank 24 and stop 22 are spaced apart with the throttle and accelerator completely closed. The accelerator rod 26 is operated as in the usual manner by an accelerator pedal 32, the latter being held in its off or closed throttle position by a return spring 34.

Referring to Figure 1, the numeral 36 designates a conventional clutch pedal operably connected to a driven clutch plate 38 of a conventional friction clutch, said plate being urged into contact with a driving clutch plate 40 by conventional springs 42. A connection 44 serves to interconnect the clutch pedal with a reciprocating piston 46, forming part of a pressure differential operated motor indicated as a whole by the numeral 48. Such a motor includes the aforementioned piston reciprocable within a double-ended casing 50, the latter being placed in fluid transmitting connection with a control valve unit 52 by a conduit 54, the valve unit controlling the efflux and influx of air out of and into the motor 48, and in general controlling the gaseous pressure within a suction compartment 56 of the motor to thereby control the engagement and disengagement of the clutch.

The control valve mechanism 52, constituting the essence of the instant invention and illustrated in detail in Figures 2 to 9, inclusive, of the drawings, is preferably housed within a unitary casing 57, generally rectangular in outline as indicated in Figure 3. An important feature of the invention lies in the compactness of the mechanism and the mounting thereof upon the throttle body 58 of the carburetor. As indicated in Figures 2, 4 and 5, a plane face 59 of the valve unit is fixedly secured by fastenings 60 to a plane face 62 of the throttle body, said faces being recessed, as referred to hereinafter, to provide air transmitting ducts interconnecting the motor 48, the atmosphere and the intake manifold 10. There is thus provided a combined valve and carburetor unit of compact structure when assembled, thereby facilitating the installation of the clutch control mechanism and in general increasing the effectiveness and efficiency and decreasing the total cost of the two mechanisms.

Referring now to the details of the valve mechanism, there is disclosed in Figure 3, the casing 57 ported at 64 to receive the conduit 54 connected to the motor 48. The casing is further ported at 66 to communicate with a recess 68 and a port 70 in the throttle body section 58 of the carburetor 12, the latter port and recess providing an atmospheric vent. If desired, the air intake may include an air cleaner 72, connected with the port 70 by a tube 74. Lastly, the casing is ported at 76 to communicate with a U-shaped recess 78 in the throttle body section, said recess communicating with a port 80 in said section opening below the throttle 14, and therefore between the throttle and the engine pistons. The last-mentioned series of interconnected ports provides a connection between the valve and intake manifold as a source of vacuum power.

The valve casing is also bored to receive a floating plunger or valve piston 82 adapted to (1) interconnect the clutch motor with the manifold via port 64, a recess 84 in the valve piston 82, port 76, recess 78 and port 80; (2) interconnect the clutch motor with the atmosphere via port 64, port 66, recess 68 and port 70; or (3) trap the air in the clutch motor, the lower end of the valve member covering up or lapping the port 64.

The valve member is operated by three major factors; namely, a compression spring 88 housed within the valve piston 82 and abutting the inner side of a so-called balancing piston 90, the gaseous pressure within a compartment 92 outlined by the pistons 82 and 90, and the pressure of the atmosphere acting on the lower head of the piston 82. The pressure within the compartment 92 is at all times that of the clutch motor by virtue of interconnecting ducts 94 and 96 in the valve casing, said ducts being connected respectively with the compartment 92 and port 64. The piston 90 is fixedly secured to a valve operating rod 98 loosely extending through an opening in an end plate 100 of the valve unit, a compression spring 102, interposed between the top of said plate and a cap 104 on the end of the rod, tending to move the rod and piston 90 upwardly. The rod 98 is forced downwardly, against the action of compression springs 88 and 102, by linkage interconnected with the accelerator comprising a link 106 connected with the crank arm 24 and a cam lever member 108 pivotally mounted at 110 to a U-shaped link or walking beam 112, the latter pivoted at one end to a standard 114 bracketed to the valve casing 57. A pin 116, secured to a dashpot piston 118, acts as a stop determining the lowermost position of the valve member 82. The aforementioned piston and rod assembly 82, 98 are biased upwardly by a compression spring 120 interposed between the lower face of the piston 118 and the inner face of a lower valve end wall 122 secured to a valve casing by fastenings 124. A guide pin 126, secured to the piston 118, extends, with a loose fit, through an opening in the end wall, a cap 128, secured to the wall and orificed at 130, completing the dashpot assembly.

Describing now the operation of the clutch control mechanism, upon release of the accelerator the return spring 34 serves, through the heretofore described linkage, to rotate the cam lever 108 clockwise until a boss 132 on the cam portion of the lever abuts the trough of the U-shaped link 112, whereupon the link is also rotated clockwise to the position disclosed in Figure 2, the spring 102 being depressed and the piston 82 contacting the pin 116 as a stop. With the valve piston 82 against the stop, the clutch motor is connected to the intake manifold as disclosed in Figure 2, whereupon the motor is evacuated and the clutch pedal moved to the full-line clutch disengaged position of Figure 1. This action takes place by virtue of the then existing evacuated condition of the manifold, resulting from the pumping action of the motor pistons at closed throttle.

With the clutch disengaged, the driver then selects the desired gear ratios of the transmission and thereafter depresses the accelerator. With the depression of the accelerator, the springs 88 and 102 act to raise the rod 98 and its connected linkage until the link 112 contacts an adjustable stop 134 mounted in the upper end of the standard 114. The lost motion between the crank 24 and stop 22 (Figures 7 to 9) is taken up with the above-described lost motion take-up between the link 112 and stop 134. At this depressed position of the accelerator a spring pressed stop 136 is encountered, advising the driver that the aforementioned lost motion has been taken up. As a further feature, the lost motion connection between the crank 24 and stop 22 is preferably determined so that the throttle is slightly open at this position, that is when the link 112 just contacts the stop 134.

With the above-described release of part of the load upon the spring 88 and the upward movement of the rod 98, the valve parts ultimately assume the positions disclosed in Figure 7. In this operation the floating piston 82 automatically moves upwardly by virtue of the fact that the force resulting from the differential of pressure acting on the piston is greater than the load from the spring 88. The piston accordingly moves upward sufficiently to interconnect the clutch motor port 64 with a chamber 138 above the dashpot piston 118, the chamber 138 being connected to the atmosphere via port 66, recess 68 and port 70, as previously described. This position of the valve member is disclosed in Figure 7. Air is thus admitted to the clutch motor to deenergize the same, and the clutch springs then act to initiate the engagement of the clutch. When the vacuum or degree of gaseous pressure within the compartment 56 of the clutch motor is reduced to a factor sufficient to just load the clutch plates with a slight initial pressure, the piston 82 is automatically moved downwardly to its lapped or balanced position, disclosed in Figure 8, cutting off the port 64 from its connection with both the manifold and atmosphere. The parts are so proportioned, constructed and arranged for the particular clutch that the clutch plates are loaded with the aforementioned predetermined pressure as a result of the aforementioned accelerator position, wherein the link 112 is just in contact with the stop 134. This position of the clutch during its engagement is known as the cushioning point, the engagement of the clutch being completely arrested, and such point may, as just described, be accurately determined, the same being a function of the depressed position of the accelerator. It is furthermore to be noted that the mechanism just described automatically compensates for clutch plate wear, for the only factor determining the arresting of the clutch at the cushion point is the gaseous pressure of the clutch motor and that of the compartment 92, the latter being in unimpeded connection with the motor.

It will be apparent that the torque of the engine is relatively low with the throttle slightly cracked, as just described; further, that the loading of the clutch plates is hardly adequate to more than just barely move the car, the acceleration of the latter being, of course, directly proportional to the impressed load of the clutch plates by the clutch springs. The driver may then both increase the engine torque and the clutch plate loading by further depressing the accelerator to effect the position of the valve parts disclosed in Figure 8. The lost motion between the link 112 and the stop 134 having been taken up, the cam lever 108 is then rotated counterclockwise, the throw of the cam being such as to progressively permit the rod 98 to move upwardly as the cam is progressively operated with opening of the throttle. In the position of the accelerator disclosed in Figure 8 the throttle is approximately one-quarter open, and the resulting vacuum of the clutch motor is preferably determined at approximately four inches of mercury. At the cushioning point, previously described, the vacuum of the motor is preferably determined at approximately five inches of mercury.

The quarter-throttle position having been established, the operation of the valve is the same as previously described, the compression of the spring 88 being reduced to permit the piston to move upwardly. The inrush of air to the clutch motor and compartment 92 then reduces the vacuum to the aforementioned four inches of mercury, whereupon the piston 82 again moves downwardly to its lapped or balanced position, the load or force of the spring 88 equaling that of the differential of pressures acting on the piston. The engagement of the clutch is thus again arrested. Should the motor leak during this lapped or slipping clutch applied position of the parts, the equilibrium of the valve will be disturbed and the piston 82 will automatically move downwardly to reconnect the motor with the manifold. This action will, of course, immediately compensate for the leakage, and the piston will resume either its lapped position or a sufficiently cracked position to maintain a constant vacuum in the clutch motor.

The aforementioned cushioning and quarter-throttle positions of the accelerator, together with intermediate positions therebetween, will be used by the driver in starting the car and in maneuvering the same into and out of position. After a shift into high gear and with the vehicle traveling at a relatively high speed, it is desirable to quickly bring the throttle to a relatively wide open position and also quickly engage the clutch, for at this time the R. P. M. of the driving clutch plate should equal or approximate the R. P. M. of the driven clutch plate, and once the plates are rotating at synchronous speeds the same should then be brought into substantially full engagement with the least possible delay. With the instant invention, this is effected by fully depressing the accelerator, whereupon the R. P. M. and resulting torque of the engine will be materially increased and the clutch plates will be quickly brought into almost complete engagement. In effecting this operation the controlling mechanism is moved to the wide open throttle position disclosed in Figure 9, the tension of the spring 88 being reduced to effect a lapped condition of the valve 82 at two inches of vacuum in the clutch motor.

An important feature of the invention lies in the provision of an adjustable stop screw 140, limiting the upward movement of the piston 82. Inasmuch as the gaseous pressure of the clutch motor is determined by the position of the piston, it follows that the stop 140 functions as a means to limit the pressure to a predetermined maximum, and therefore limit the degree of clutch plate loading as the clutch is being engaged. The stop is accordingly set to limit the loading to a factor insuring a smooth start of the vehicle, for during the clutch engagement, particularly in starting the car in low gear, should the accelerator be too suddenly depressed the loading easily might be such as to effect a grabbing clutch action. It has been found in practice that a vacuum of approximately two inches will suffice to effect a smooth start; therefore, the aforementioned full travel position, disclosed in Figure 9, is such as to effect this vacuum.

Should the clutch motor leak after the full throttle operation just described, the balance of the piston 82 would be upset and the motor reconnected with the manifold. With a wide open throttle, however, the gaseous pressure of the manifold is quickly brought to atmospheric; therefore, a check valve 142, which may, if desired, be adjustably spring loaded, is incorporated in the casing to close off the port 76. The control valve unit is thus provided with an additional means for limiting the pressure in the clutch motor, for upon bringing the manifold to atmospheric pressure the check valve 142 will automatically seat and thereby maintain the aforementioned two inches of vacuum in the clutch motor.

With the limiting of the clutch motor pressure, either by the stop 140 or the valve 142, the clutch is obviously not completely engaged; therefore, means must be provided for completing the bleed of air into the clutch motor to complete the engagement of the clutch. The above-described dashpot mechanism serves this purpose, for after the pressure upon the pin 116 is removed with a depression of the accelerator the compressed spring 120 of the dashpot immediately moves the piston 118 and its connected pin 116 upwardly at a rate depending upon certain factors including (1) the size of opening 130, (2) the force of the spring 120, (3) the size and proportioning of the parts of the dashpot, (4) the frictional resistance to movement, and (5) the gaseous pressures of the compartment 138 and the atmosphere. The parts are preferably constructed, arranged and adjusted to effect a complete upward movement of the pin 116 in thirty seconds. The piston 82 is thus moved to permanently vent the clutch motor to atmosphere after this elapsed time and insure a complete engagement of the clutch: however, under usual driving conditions the car has been sufficiently accelerated during this interval. The operation of the dashpot does not, therefore, affect the function of the stop 140 in obviating a grabbing clutch action.

If desired, a stop 144 may be incorporated in the valve mechanism to permanently cut out the operation of the valve, and therefore the clutch control mechanism. This stop is operated from the dash by a Bowden control 146 connected to a crank 148, the latter operatively connected to the stop.

There is thus provided an efficient clutch control mechanism, the loading of the clutch being directly proportional, up to a predetermined limit, to the position of the accelerator, and therefore the engine torque. The car may be effectively maneuvered into a desired position with alternative depression and release of the accelerator. Furthermore, should the vehicle be excessively loaded or mired, the engine torque may be increased to a relatively high factor, by a rapid depression of the accelerator, before the clutch plate loading reaches its maximum for a given accelerator position: this action is a resultant of the relative time lag in the mechanical operation of the parts and the flow of air to and from the clutch motor. It follows, therefore, that the control of the throttle and clutch may be varied at will, depending upon the technic of operation of the accelerator: however, for all normal and relatively slow depressions of the accelerator the engine torque will be directly proportional, at any given instant, to the clutch loading.

It will be understood that while the illustrated embodiments of the invention are described as shown a considerable latitude is to be permitted in constructon within the scope of the appended claims.

I claim:

1. In a clutch operating mechanism for an automotive vehicle provided with a clutch and a throttle, a pressure differential operated power device connected with the clutch, pressure sensitive valvular means for controlling the operation of said power device, linkage having a lost motion connection therein interconnecting said throttle and valvular means, said latter means being operative upon movement of the engine throttle to idling position to render the power device operative to disengage the clutch and operative upon movement of the throttle toward open position for successively releasing the clutch elements for movement toward operative engagement to arrest the movement of the clutch elements at an initial point of operative engagement, and then further releasing the clutch elements for movement into further operative engagement, said valvular means being operative for arresting the movement of the clutch elements at progressively later points in accordance with the progressively more rapid opening movement of the engine throttle.

2. In a clutch operating mechanism for an automotive vehicle provided with a clutch and a throttle, a pressure differential operated power device connected with the clutch, valvular means for controlling the operation of said power device, linkage having a lost motion connection therein interconnecting said throttle and valvular means, said latter means being operative upon movement of the engine throttle to idling position for rendering the power device operative to disengage the clutch and operative upon movement of the throttle toward open position for successively releasing the clutch elements for movement toward operative engagement to arrest the movement of the clutch elements at an initial point of operative engagement, and then further releasing the clutch elements for movement into further operative engagement, said valvular means being operative for arresting the movement of the clutch elements at progressively later points in accordance with the progressively more rapid opening movement of the engine throttle, together with other means operative to operate said valvular means to insure a complete clutch engaging operation thereof after the lapse of a predetermined time interval.

3. The combination with the clutch and throttle of a motor vehicle, of a pressure differential operated motor operably connected with the clutch, valve means for controlling the operation of said motor, valve and throttle operating means interconnecting said throttle and valve means including a lost motion connection, said valve being operative upon movement of the engine throttle to idling position for rendering the motor operative to disengage the clutch and operative upon movement of the throttle toward open position for progressively releasing the clutch elements for movement toward operative engagement to arrest movement of the clutch elements at an initial point of engagement prior to full operative engagement, and then further releasing the clutch elements by intermittent stages for movement into operative engagement.

4. The combination with the clutch and throttle of a motor vehicle, of a pressure differential operated motor operably connected with the clutch, valve means for controlling the operation of said motor, valve and throttle operating means interconnecting said throttle and valve means including a lost motion connection, said valve being operative upon movement of the engine throttle to idling position for rendering the motor operative to disengage the clutch and operative upon movement of the throttle toward open position for progressively releasing the clutch elements for movement toward operative engagement to arrest the movement of the clutch elements at an initial point of operative engagement and then further releasing the clutch elements for movement into further operative engagement by intermittent stages, together with automatically operable power operated means for in part controlling the clutch engaging operation of said valve means.

5. The combination with the clutch and throttle of a motor vehicle, of a pressure differential operated motor operably connected with the clutch, valve means for controlling the operation of said motor, valve and throttle operating means interconnecting said throttle and valve means including a lost motion connection, and further including leverage changing means and a stop, said valve being operative upon movement of the engine throttle to idling position for rendering the motor operative to disengage the clutch and operative upon movement of the throttle toward open position for intermittently releasing the clutch elements for movement toward operative engagement, said intermittent movement including by virtue of the aforementioned stop and leverage changing means, an arresting of the movement of the clutch elements at an initial point of operative engagement and then further releasing the clutch elements for movement into operative engagement by successive stages.

6. The combination with the clutch and throttle of an automotive vehicle, of power means for operating the clutch, said means including a pressure differential operated motor operably connected to the clutch, valve means for controlling the operation of said motor, and lever changing means for jointly operating said throttle and valve means, said valve means including means operative in accordance with the position of said operating means for establishing an unvariable energization of said motor to thus maintain the clutch either completely disengaged or partly engaged, said valve means further including means for limiting the deenergization of said motor to a predetermined minimum as the clutch is being engaged.

7. Clutch control mechanism for an automotive vehicle provided with an accelerator and a clutch, said mechanism comprising a pressure differential operated motor operably connected with the clutch, an accelerator operated follow-up valve for controlling the operation of said motor, and leverage changing means interconnecting said accelerator and valve.

8. Clutch control mechanism for an automotive vehicle provided with an accelerator and a clutch, said mechanism comprising a pressure differential operated motor operably connected with the clutch, and an accelerator operated follow-up valve for controlling the operation of said motor, said valve including stop means and leverage varying linkage for so controlling the clutch engaging operation of the motor as to limit the clutch plate loading to a predetermined maximum.

9. Clutch operating mechanism for motor vehicles including a clutch and an accelerator and comprising in combination therewith a vacuum operated power device connected to the vehicle clutch, and further comprising a control valve for said power device having a port communicating with said power device and ports communicating respectively with the intake manifold of the vehicle engine and the atmosphere, together with a floating valve plunger reciprocable within said casing and operably connected with the accelerator, said latter connection including a spring in series in the connection to permit the plunger to float to connect the power device with the atmosphere or manifold or cut off the connection with either of said sources of fluid pressure.

10. Clutch operating mechanism for motor vehicles, including a clutch and an accelerator for the vehicle engine, comprising a vacuum operated power device connected to the vehicle clutch, a valve casing having a port communicating with said power device and also having ports communicating respectively with the intake manifold of the vehicle engine and the atmosphere, a valve member slidable in said valve casing, valve operating means interposed between said valve member and accelerator, yielding means between said valve and accelerator, said valve operating means being operable to vary the tension of said yielding means to thereby control the movement of said valve member to control the interconnection between said ports.

11. In a clutch control mechanism for an automotive vehicle, an engine including a source of sub-atmospheric pressure, an accelerator, a clutch, differential fluid pressure operated power means to actuate the clutch, accelerator operated valve means controlling the power means, and leverage varying means interconnecting the accelerator and valve means.

HAROLD W. PRICE.